(12) United States Patent
Johnson et al.

(10) Patent No.: US 8,245,458 B2
(45) Date of Patent: Aug. 21, 2012

(54) WIND TURBINE WITH TOWER SUPPORT SYSTEM AND ASSOCIATED METHOD OF CONSTRUCTION

(75) Inventors: Stephen Bertram Johnson, Greenville, SC (US); Danian Zheng, Simpsonville, SC (US); Balaji Haridasu, Bangalore (IN); William Francis Gevers, Easley, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/109,519

(22) Filed: May 17, 2011

(65) Prior Publication Data
US 2012/0023859 A1   Feb. 2, 2012

(51) Int. Cl.
*E04H 12/20* (2006.01)
*E04H 12/00* (2006.01)

(52) U.S. Cl. ....... 52/152; 52/146; 52/651.01; 52/651.11
(58) Field of Classification Search ............ 52/146, 52/152, 153, 154, 169.13, 170, 649.2, 649.3, 52/649.6, 651.01, 651.07, 834, 745.03, 745.04, 52/745.17, 745.18, 651.11; 248/163.1, 440, 248/500, 511
See application file for complete search history.

(56) References Cited

U.S. PATENT DOCUMENTS

| | | | | |
|---|---|---|---|---|
| 1,473,054 A * | 11/1923 | Smith et al. | ...................... | 52/117 |
| 3,371,458 A * | 3/1968 | Sturgill | ....................... | 52/651.01 |
| 3,561,711 A * | 2/1971 | Dodge | ....................... | 248/163.1 |
| 4,340,822 A * | 7/1982 | Gregg | ............................. | 290/55 |
| 5,131,133 A * | 7/1992 | Peterson et al. | ............. | 52/741.3 |
| 6,655,097 B1 * | 12/2003 | Poolaw | ........................ | 52/127.2 |
| 7,160,085 B2 | 1/2007 | de Roest | | |
| 7,365,446 B2 | 4/2008 | Wobben | | |
| 7,464,512 B1 * | 12/2008 | Perina | ........................ | 52/651.01 |
| 7,549,264 B2 | 6/2009 | Wobben | | |
| 7,913,463 B2 * | 3/2011 | Russell | ......................... | 52/127.2 |
| 7,993,107 B2 * | 8/2011 | Gevers | ...................... | 416/244 R |

(Continued)

FOREIGN PATENT DOCUMENTS
DE     102 06 242 A1    9/2003

(Continued)

OTHER PUBLICATIONS www.windtowersystems.com—Product Information Pages.

*Primary Examiner* — Joshua J Michener
*Assistant Examiner* — Ryan Kwiecinski
(74) *Attorney, Agent, or Firm* — Dority & Manning, P.A.

(57) ABSTRACT

A wind turbine has a nacelle mounted atop a tower, with a support system configured around a base portion of the tower. The support system includes a plurality of support fins spaced radially around the base portion. Each of the support fins has a continuous header member secured to the tower and a continuous face member extending radially outward and downward from the header member towards ground. The support fins include a web extending between the header member and face member. The support fins extend from the tower with a length and at an acute extension angle relative to a longitudinal axis of the tower so as to provide vertical and lateral support around the circumference of the tower.

10 Claims, 4 Drawing Sheets

U.S. PATENT DOCUMENTS

| | | |
|---|---|---|
| 2003/0009959 A1* | 1/2003 | Bruce .................... 52/146 |
| 2006/0156681 A1 | 7/2006 | Fernandez Gomez et al. |
| 2006/0272244 A1 | 12/2006 | Jensen |
| 2007/0296220 A1 | 12/2007 | Kristensen |
| 2008/0040983 A1 | 2/2008 | Fernandez Gomez et al. |
| 2009/0021019 A1 | 1/2009 | Thomsen |
| 2009/0031639 A1 | 2/2009 | Cortina/Cordero |
| 2009/0307998 A1* | 12/2009 | Zavitz et al. ................ 52/152 |
| 2009/0309367 A1* | 12/2009 | Perner et al. ................ 290/54 |
| 2010/0301613 A1* | 12/2010 | Oosterling .................. 290/55 |

FOREIGN PATENT DOCUMENTS

| | | |
|---|---|---|
| JP | 11082285 A | 3/1999 |
| WO | WO 2004/094819 A1 | 11/2004 |

* cited by examiner

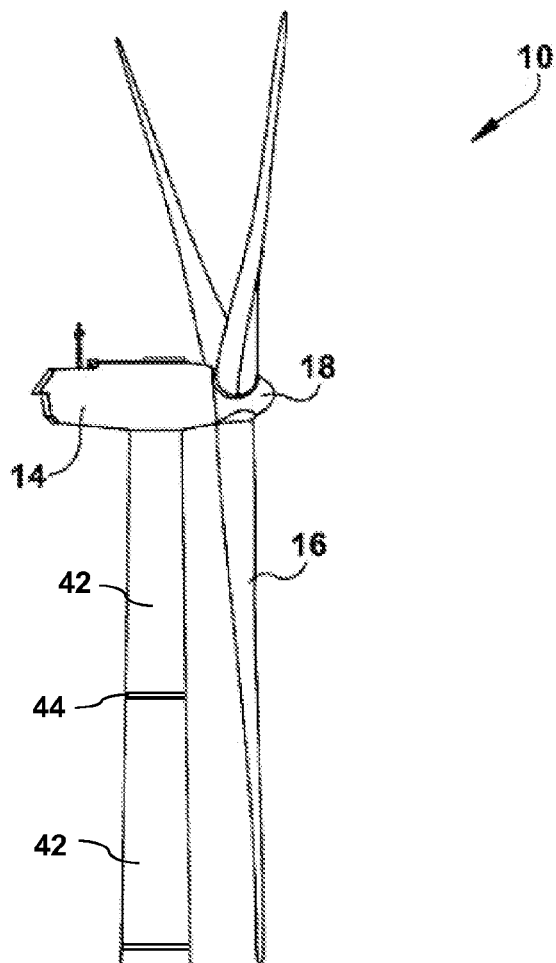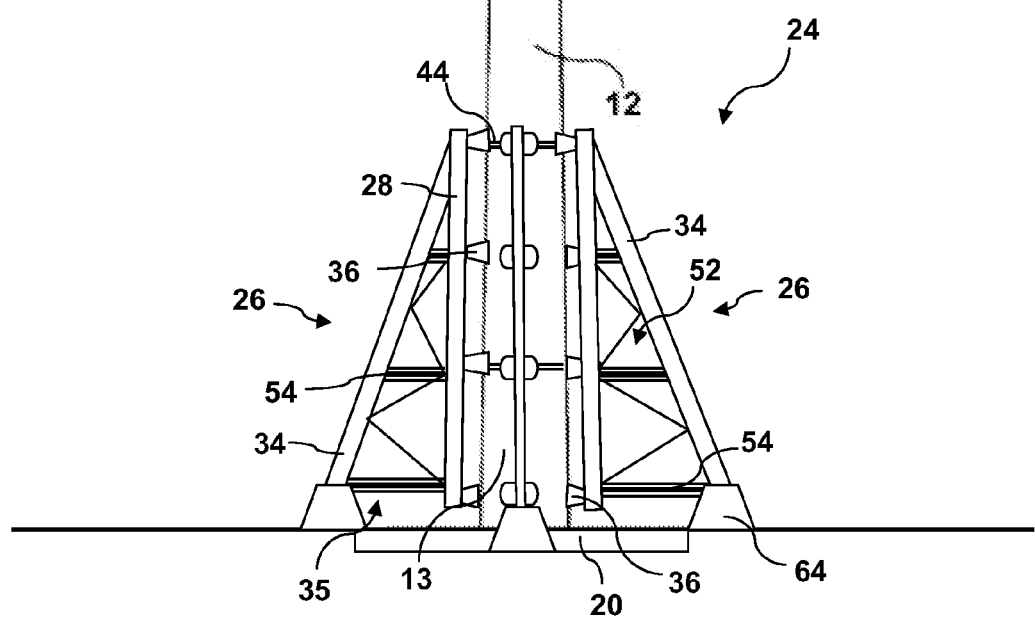
Fig. -1-

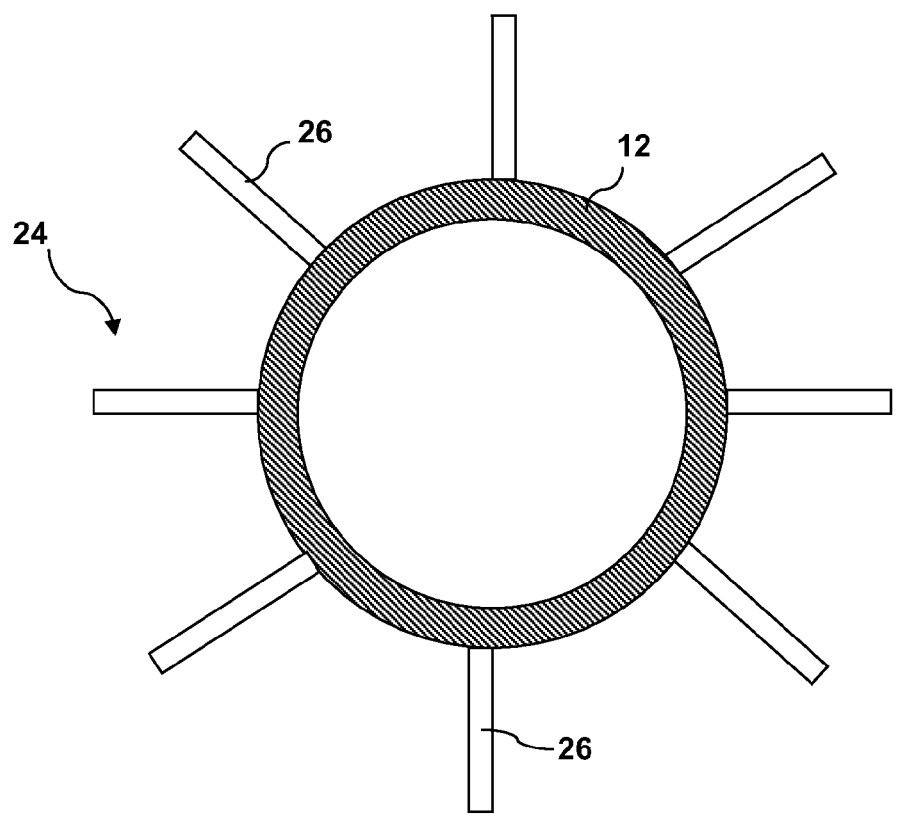
Fig. -2-
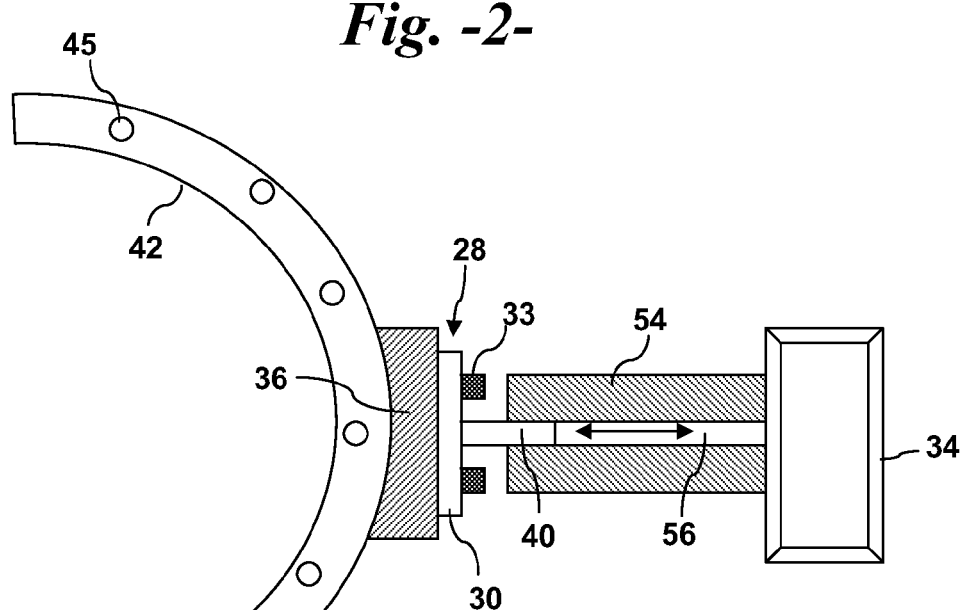
Fig. -3-

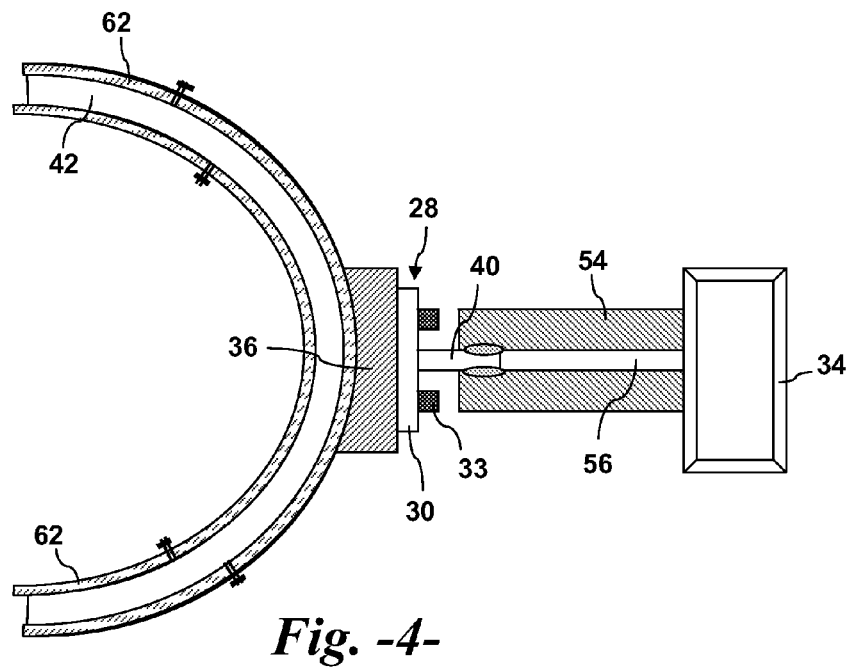
Fig. -4-
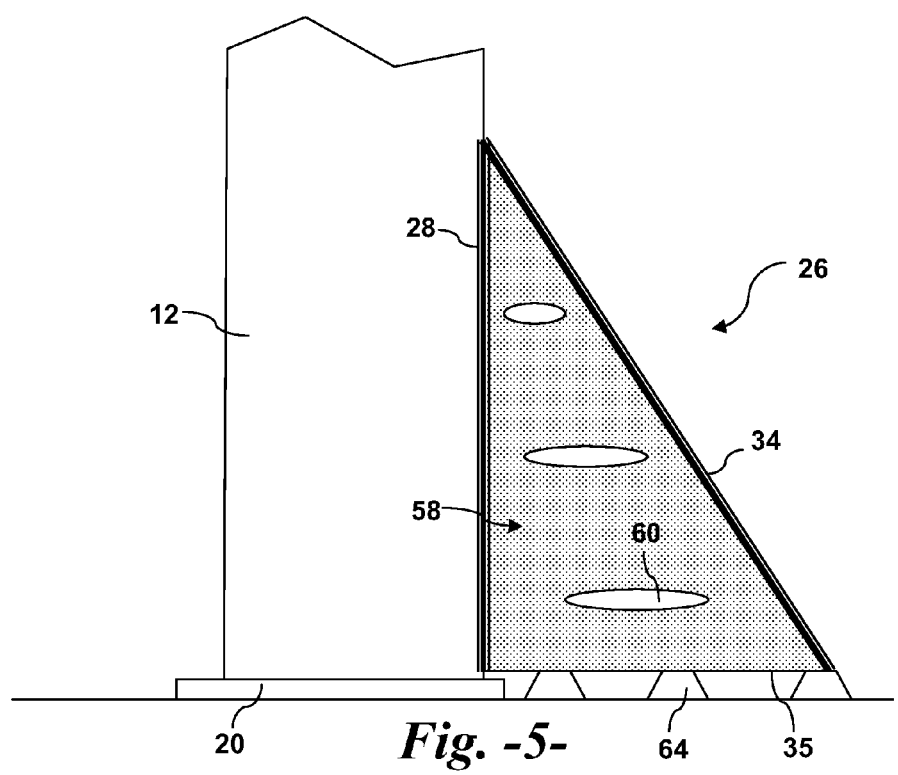
Fig. -5-

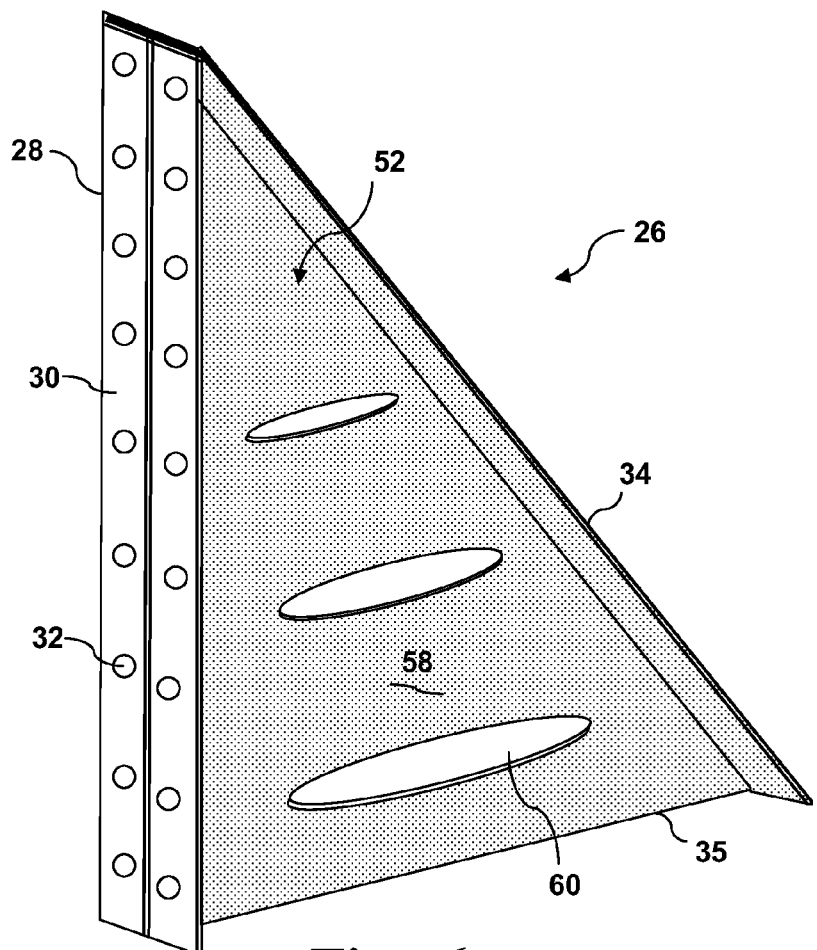
Fig. -6-
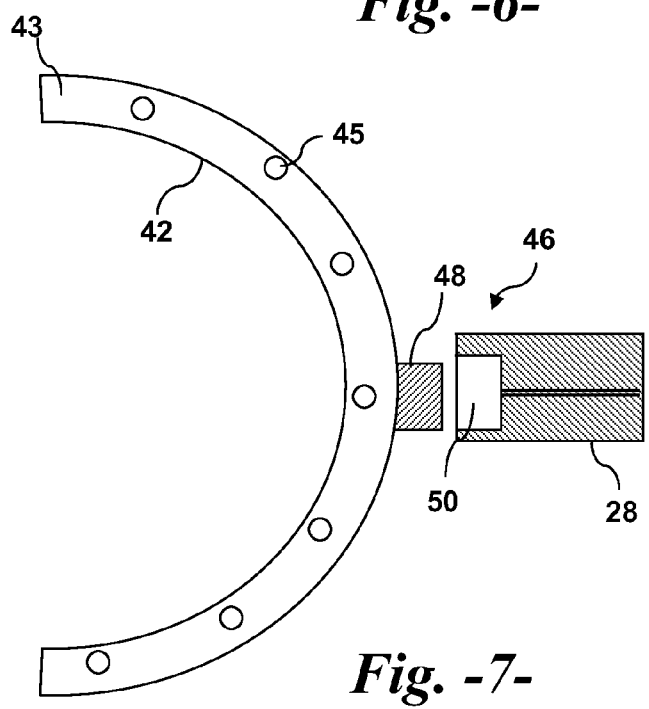
Fig. -7-

WIND TURBINE WITH TOWER SUPPORT SYSTEM AND ASSOCIATED METHOD OF CONSTRUCTION

FIELD OF THE INVENTION

The present invention relates generally to the field of wind turbines, and more particularly to a support system for wind turbine towers.

BACKGROUND OF THE INVENTION

Modern land-based ("onshore") wind turbines in the megawatt range have grown increasingly more powerful and correspondingly larger. The towers that support the power generating components of these wind turbines can exceed well over 60 meters in height. For example, GE Wind Energy offers a 2.5 MW wind turbine with standard available hub heights of 75 meters, 85 meters, and 100 meters. Larger wind turbines with hub heights in excess of 100 meters are becoming more common.

The tower structures of these large wind turbines can be massive, particularly at the base section of the tower wherein a significant footprint and weight are needed to achieve design tower support criteria. In this regard, the towers are becoming increasing more expensive to manufacture, transport, and erect. In many instances, the dimensions of the lower tower sections are limiting factors in site selection and transport of the tower sections to the site. For example, the tower sections cannot exceed a local jurisdiction's maximum size and weight limits for rail and truck transport.

Accordingly, the industry would benefit from an improved tower structure that is capable of supporting larger turbines at significant hub heights without the size, weight, and cost issues of conventional towers.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine is provided with a nacelle mounted atop a tower. The nacelle is configured with any manner of wind turbine power generating components. The tower has a base portion that is configured for support on any manner of suitable ground level foundation. A tower support system is provided with a plurality of support fins spaced radially around the base portion of the tower. Each of the support fins has a continuous header member that is secured to the tower and a continuous face member that extends radially outward and downward from the header member towards ground. For example, the face member may extend from the top end of the header member such that the support fin has an overall generally triangular shape. Each support fin also includes a web structure that extends between the header member and the face member. The support fins extend from the tower with a length and at an acute extension angle relative to a longitudinal axis of the tower so as to provide vertical and lateral support around the circumference of the tower.

The support system provides for a reduction in the weight and footprint of the base portion of the tower. In this regard, the tower may be a tubular member that has a substantially constant diameter from the location of the support fins to the base end of the tower, and may also have a substantially constant mass per unit of length along this section.

In a particular embodiment, the support fins may vary in size and extension angle around the circumference of the tower to accommodate for uneven ground terrain around the tower, or any other factor.

The header member may be secured to the tower base portion in various ways. For example, in a particular embodiment, a plurality of vertically aligned and spaced apart bearing blocks are fixed to the base portion at the location of the support fins, with the header member secured to bearing blocks. Thus, the header member is at a stand-off distance from the tower and intermittently supported by the bearing blocks. In an alternate embodiment, the header member may be secured directly against the outer circumferential surface of the tower along the length of the header member. For example, the header member may have a flange that is bolted directly to the tower.

The support system may include alignment structure configured between the header member and the base portion to ensure precise placement and location of the support fins around the tower. This alignment structure may be, for example, one or more protrusions provided on one of the header member or the base portion that engage in recesses defined in the other of the base portion or the header member.

The support fin web may also vary. In one embodiment, the web is an open lattice structure with a plurality of braces extending between the header member and the face member. These braces may be rigidly fixed to header member or, in a different embodiment, may have a degree of relative movement or "float" with respect to the header member to accommodate for any design flexure in the tower or support fin.

In other embodiments, the web may be generally continuous plate member that extends between the header member and the face member. Any pattern of holes or passages may be defined through the plate member for weight reduction.

It may be desired to add structural rigidity and strength to some or all of the connection points between the tower and header member. For example, a reinforcing support ring may be affixed to the base portion at the attachment locations by welding, cement, bonding compound, or any other suitable means. The support ring may be affixed around an outer circumference of the base portion or against an inner circumferential surface of the tower base portion. In the embodiment wherein the header member is secured to the base portion via bearing blocks, the blocks may be fixed to the support ring.

The present invention also encompasses various process embodiments for erecting a tower support system around a base portion of a wind turbine tower. Positions are defined around the circumference of the base portion for attachment of the support fins. At each position, a continuous header member of a respective support fin is secured to the base portion. The support fins have a continuous face member and a web extending between the header member and the face member.

In a particular process embodiment, the header member is intermittently secured to the base portion by fixing a plurality of spaced apart and vertically aligned bearing blocks at each of the support fin positions, and securing the header member to the bearing blocks. It may be desired to fix a support ring to the base portion, and to secure at least one of the bearing blocks at each support fin position to the support ring. Alternatively, the header member may be fixed directly against the base portion along the longitudinal length of the header member.

When completed, the support fin may be an open lattice structure, wherein the support fin is constructed at the wind turbine site by attaching the face member to the header member and securing a plurality of braces between the header member and the face member. Alternatively, the support fins may be pre-assembled and delivered to the wind turbine site, wherein the support fins are configured on the tower by securing the header members to the defined positions on the tower.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which:

FIG. 1 is a perspective view of a wind turbine with a tower support system in accordance with aspects of the invention;

FIG. 2 is a top cut-away view of a wind turbine tower with a plurality of support fins disposed around the base portion of the tower;

FIG. 3 is a top cut-away view of an embodiment of support fin;

FIG. 4 is a top cut-away view of an alternative embodiment of a support fin;

FIG. 5 is a side view of a tower with yet another embodiment of a support fin configured therewith;

FIG. 6 is a perspective view of the support fin of FIG. 5; and,

FIG. 7 is a top cut-away view of an embodiment of alignment structure between the tower and support fin.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 illustrates a wind turbine 10 with a tower 12 and a nacelle 14 mounted atop the tower 12. A plurality of turbine blades 16 are mounted to a rotor hub 18, which is in turn connected to a main flange that turns a main rotor shaft within the nacelle 14. The wind turbine power generation and control components are housed within the nacelle 14. The tower 12 may be of any conventional construction and has a base portion 13 supported by any manner of suitable ground level foundation 20. In the illustrated embodiment, the tower 12 is defined by a plurality of stacked segments 42 that are typically erected at the turbine site. The segments 42 are joined at joint lines 44, for example by bolting end flanges 43 (FIG. 3) of the segments 42 with bolts 45, as in well known in the art.

The wind turbine 10 of FIG. 1 is provided for illustrative purposes only to place the present invention in an exemplary field of use. It should be appreciated that the invention is not limited to any particular type of wind turbine configuration.

FIG. 1 also illustrates an embodiment of a tower support system 24 in accordance with aspects of the invention. The support system 24 includes a plurality of radially extending support fins 26 circumferentially spaced around the tower, as depicted in FIG. 2. The support fins 26 are configured around the base portion 13 of the tower 12 and extend towards the nacelle 14 to a height that may vary as a function of any number of variables, including the overall height of the tower 12, the weight supported by the tower 12, location of the tower 12 at a particular onshore site, and so forth. For example, the support fins 26 may extend to a height of between about 25% to about 75% of the height of the tower 12 as measured from the bottom of the base portion 13. The particular height of the support fins 26 is not a limiting factor of the invention.

Because the support system 24 provides a designed degree of lateral and vertical support for the tower 12 (as well as all of the components mounted atop the tower 12), the base portion 13 of the tower 12 need not be as wide or heavy as in prior tower structures. In a particular embodiment depicted for example in FIGS. 1 and 5, the tower 12 may thus have a relatively constant diameter from the top of the support fins 26 to the bottom of the tower 12. In other words, the tower 12 need not taper significantly outwardly along the base portion 13 in order to provide a relatively large support footprint as in prior art tower structures. In addition, the tower 12 incorporating the support system 24 need not have the weight required in other tower structures.

Referring to FIG. 1, the plurality of support fins 26 are depicted as generally uniformly shaped triangular structures. It should be appreciated that the individual support fins 26 may have different sizes and shapes. For example, certain of the support fins 26 may have a base aspect 35 that extends further from the tower 12 as compared to other support fins, or a height dimension that is greater than other support fins 26. These differences may be due, in part, to the contours in the terrain surrounding the ground level foundation 20. It should thus be appreciated that the size, shape, and location of the respective support fins 26 may vary as a function of the location of the tower 12, which also allows the tower 12 to be erected on sloped terrain, or at the base of a hill or other rise in the terrain, and so forth. Sites that were not previously available may be utilized for erection of wind turbines 10 utilizing the tower support system 24.

Referring again to FIG. 1, the support fins 26 have a continuous header member 28 that is secured to the tower 12 by any suitable means, as discussed in greater detail below. Each support fin 26 also includes a continuous face member 34 that extends radially outward and downward from the header member 28 towards the ground. For example, the support fin may have a generally triangular shape wherein the continuous face member 34 extends radially outward and downward from the top of the header member 28. In alternative embodiments, the face member 34 need not extend to the top of the header member 28, and may extend from any intermediate position along the header member 28.

Each of the support fins 26 also includes a web structure that extends between the header member 28 and the face member 34, as discussed in greater detail below.

In the embodiment of FIGS. 1, 3, and 4, a plurality of vertically aligned and spaced apart bearing blocks 36 are fixed to the tower at the respective locations of the support fins 26. These bearing blocks 36 are rigidly fixed to the tower, for example with bolts 33 (FIGS. 3 and 4), welding, bonding material, or the like. The bearing blocks 36 provide attachment locations for the header 28, as particularly indicated in FIG. 1. For example, referring to FIGS. 3 and 4, the header member 28 may be defined by a generally T-shaped beam member wherein the flange portion 30 is bolted to the bearing blocks 36 with bolts 33 (that may also be used to attach the bearing block 36 to the tower segment 42).

As mentioned above, the tower 12 may be defined by a plurality of stacked segments 42 that are joined at joints 44 by bolts 45. These joints 44 define a structurally sound attachment location for the bearing blocks 36, as depicted in FIG. 1. For the additional bearing blocks 36 that cannot be located on a joint line 44, it may be desired to provide a reinforcement member on the tower 12 at the attachment location. For example, referring to FIG. 4, a support ring 62 may be attached to the outer and/or inner circumferential surface of the tower segment 42 by any suitable means, such as bonding material, welding, cement, and so forth. The ring or rings 62 provide increased structural support to the tower 12 and bearing blocks 36. The rings 62 may be provided in a plurality of segments that are assembled together around the tower 12, as indicated in FIG. 4, or may be a continuous support ring that is slid over the tower segment 42 prior to assembly of the tower 12.

In an alternate embodiment, the header member 28 may be secured directly against the tower 12 without intervening structure (such as the bearing blocks 36). For example, FIGS. 5 and 6 illustrate an embodiment wherein the support fin 26 includes a continuous header member 28 that may have, for example, a generally T-shaped or L-shaped beam with a flange 30 (with bolt holes 32) that is contoured so as to be bolted or otherwise attached directly against the tower 12. In the embodiment of FIG. 6, the fin 26 is defined by adjacently configured L-shaped flanges along the header member 28, as well as along the continuous face member 34.

Particularly with the embodiments wherein the header member 28 is secured directly against the tower 12, it may be desired to provide alignment structure 46 between the header member 28 and the tower 12. For example, referring to FIG. 7, the alignment structure may include any manner of protrusion 48 that is provided on either of the tower segment 42 or the header member 28, and a corresponding recess 50 that is provided on the other respective components. In FIG. 7, the protrusion 48 is defined on the tower segment 42 and the recess 50 is defined in the header member 28. The protrusion 48 may be a continuous member disposed vertically on the tower segment 42, or may comprise spaced apart members. Likewise, the recess 50 may be a continuous channel defined in the header member 28, for example, between the adjacent beams in the embodiment of FIG. 6, or may be a series of independent recesses defined along the length of the header member 28. The engaging alignment structure 46 provides a means to ensure proper placement and orientation of the fins 26 relative to the tower 12.

In the embodiment of FIGS. 1, 3, and 4, the web 52 is an open lattice type of structure having a plurality of braces 54 that extend between the header member 28 and the face member 34. These braces 54 may be any manner of beam, pipe, or other rigid support member. The braces 54 may be rigidly affixed to the face member 34 and header member 28 by any suitable means, including mechanical fasteners (e.g. bolts), welding, epoxies, and the like. FIG. 4 depicts the braces 54 as welded to an extension 40 of the header member 28 (which may be a T-shaped beam member).

In an alternative embodiment as depicted in FIG. 3, it may be desired that the braces 54 have a degree of relative movement with respect to the header member 28. For example, the braces 54 may be rigidly fixed to the face member 34 while the extension 40 of the header member 28 is free to "float" or slide within the space 56 defined between the braces 54. This particular configuration may be desired if the support fins 26 are designed to accommodate relative movement of the tower 12 that may result from any combination of operational conditions, such as high wind, seismic events, and the like.

In the embodiment of FIGS. 5 and 6, the web 52 is defined by a generally continuous plate member 58 that extends between the header member 28 and face member 34. The plate member 58 may be welded or otherwise permanently attached along the mating edges with the header member 28 and face member 34. Any manner and pattern of openings or holes 60 may be defined through the plate member 58 for weight reduction or other reasons.

Referring to FIGS. 1 and 5, it should be appreciated that any manner of footing 64 or other support may be provided along the base 35 of the support fins 26 to support the radial extension of the fins 26 relative to the ground.

The present invention also encompasses various process embodiments for directing a tower support system 24 around a base portion of a wind turbine tower 12, as generally discussed above. For example, in a particular embodiment, a process involves defining the positions for the support fins around the circumference of the base portion of the tower. At each such position, a continuous header member 28 of a respective support fin 26 is secured to the tower, with the support fin also having a continuous face member 34 and a web 52 extending between the header member and the face member.

In a particular process embodiment, a plurality of spaced apart and vertically aligned bearing blocks 36 may be fixed to the base portion of the tower at each of the respective support fin positions prior to securing the header member 28 to the bearing blocks 36, as discussed above. In still a further embodiment, a support ring 62 may be attached to the outer or inner circumferential surface of the tower prior to attaching the bearing blocks 36, as discussed above.

In an alternate process embodiment, the header member 28 may be fixed directly against the base portion of the tower along the longitudinal length of the header member 28 without intervening attachment structure.

The process may further include pre-constructing the support fins prior to securing the continuous header 28 to the base portion of the tower such that the support fins 26 are attached to the tower as preassembled units, which may be particularly useful with the embodiments of FIGS. 5 and 6.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine, comprising:
 a nacelle;
 a tower, said nacelle mounted atop said tower, said tower having a base portion;
 a tower support system, said tower support system further comprising:
   a plurality of support fins spaced radially around said base portion;
   each said support fin comprising a continuous header member secured to said tower and a continuous face member extending radially outward and downward from said header member towards ground; and, each said support fin comprising a web extending between said header member and said face member;

wherein said support fins extend from said tower with a length and at an acute extension angle relative to a longitudinal axis of said tower so as to provide vertical and lateral support around the circumference of said tower;

engaging alignment structure configured between said header member and said base portion; and wherein said alignment structure comprises protrusions on one of said header member or said base portion that engage in recesses defined in the other of said base portion or said header member.

2. The wind turbine as in claim 1, wherein said header member is secured directly against said base portion along generally the entire longitudinal length of said header member.

3. A wind turbine, comprising:

a nacelle;

a tower, said nacelle mounted atop said tower, said tower having a base portion;

a tower support system, said tower support system further comprising:

a plurality of support fins spaced radially around said base portion;

each said support fin comprising a continuous header member secured to said tower and a continuous face member extending radially outward and downward from said header member towards ground; and, each said support fin comprising a web extending between said header member and said face member;

wherein said support fins extend from said tower with a length and at an acute extension angle relative to a longitudinal axis of said tower so as to provide vertical and lateral support around the circumference of said tower; and further comprising at least one support ring affixed to said base portion at a location of attachment of said header member to said base portion.

4. The wind turbine as in claim 3, wherein said web is an open lattice structure with a plurality of braces extending between said header member and said face member.

5. The wind turbine as in claim 4, wherein said braces are configured on said header member with a degree of float relative to said header member in a direction transverse to said header member.

6. The wind turbine as in claim 3, wherein said web comprises a generally continuous plate member extending between said header member and said face member.

7. The wind turbine as in claim 3, wherein said support ring is affixed around an outer circumference of said base portion.

8. The wind turbine as in claim 7, further comprising a plurality of vertically aligned and spaced apart bearing blocks fixed to said base portion, at least one of said bearing blocks fixed to said support ring, said header member secured to said bearing blocks.

9. The wind turbine as in claim 3, further comprising a plurality of vertically aligned and spaced apart bearing blocks fixed to said base portion, said header member offset from said base portion and secured to said bearing blocks, said support ring affixed to said base portion at a location of said bearing blocks.

10. The wind turbine as in claim 9, wherein said tower comprises a plurality of stacked segments with joints between adjacent segments, at least certain of said bearing blocks fixed to said base portion at said joints.

* * * * *